(12) United States Patent
Baiden (10) Patent No.: US 10,187,160 B2
(45) Date of Patent: Jan. 22, 2019

(54) OPTICAL RECEIVER

(71) Applicant: Penguin Automated Systems Inc., Naughton (CA)

(72) Inventor: Gregory Baiden, Lively (CA)

(73) Assignee: Penguin Automated Systems Inc. (CA)

( * ) Notice: Subject to any disclaimer, the term of this patent is extended or adjusted under 35 U.S.C. 154(b) by 1 day.

(21) Appl. No.: 15/314,780

(22) PCT Filed: Jun. 1, 2015

(86) PCT No.: PCT/CA2015/000357
§ 371 (c)(1),
(2) Date: Nov. 29, 2016

(87) PCT Pub. No.: WO2015/179961
PCT Pub. Date: Dec. 3, 2015

(65) Prior Publication Data
US 2017/0222728 A1    Aug. 3, 2017

Related U.S. Application Data

(60) Provisional application No. 62/006,121, filed on May 31, 2014.

(51) Int. Cl.
| H04B 10/60 | (2013.01) |
| G02B 6/44 | (2006.01) |
| H04B 10/25 | (2013.01) |
| H04B 10/11 | (2013.01) |

(52) U.S. Cl.
CPC ........... *H04B 10/60* (2013.01); *G02B 6/4439* (2013.01); *H04B 10/11* (2013.01); *H04B 10/2504* (2013.01)

(58) Field of Classification Search
CPC ................ H04B 10/564; H04B 10/505; H04B 10/5057; G02B 6/4292
See application file for complete search history.

(56) References Cited

U.S. PATENT DOCUMENTS

| 5,293,039 A * | 3/1994 | Mongiols | G08B 13/10 250/227.14 |
| 5,518,965 A * | 5/1996 | Menigaux | G02B 6/13 438/27 |
| 2008/0245533 A1* | 10/2008 | Coronado | E21B 47/0006 166/378 |
| 2012/0006566 A1* | 1/2012 | Earles | E21B 17/1035 166/382 |
| 2012/0043466 A1* | 2/2012 | Weidenbruch | G01F 23/288 250/362 |
| 2017/0222728 A1* | 8/2017 | Baiden | H04B 10/564 |

* cited by examiner

*Primary Examiner* — Mina Shalaby
(74) *Attorney, Agent, or Firm* — DLA Piper LLP (US)

(57) ABSTRACT

An optical receiver is provided. The optical receiver includes a fiber support structure located on a front side of a back plate. The fiber support structure supports and guides a plurality of scintillating fibers in a spiral arrangement extending from a back orifice through the back plate. A central guide located around the back orifice is adapted to gather and collect the plurality of scintillating fibers from their disperse spiral arrangement on the fiber support structure and direct them through the back orifice as a bundle into a photo detector located behind the back plate.

6 Claims, 9 Drawing Sheets

OPTICAL RECEIVER

TECHNICAL FIELD

This disclosure relates to communications devices. In particular, this invention relates to optical communications devices.

TECHNICAL BACKGROUND

Many industrial activities are carried out in environments unfavourable for human workers. One solution has been to replace the physical presence of a worker with a robotic tool guided by a worker at a remote location, commonly referred to as teleoperation. Other solutions may include autonomous robotic actors with varying degrees of control function provided by remote operators.

One area of robotic operations that has been improving is the use of wireless communications to and, as a result, high bandwidth wireless communication is desirable for the teleoperation of mobile devices and vehicles, among other applications. For example, in underwater environments, these activities include mining, oil exploration and extraction, installation of telecommunications cables etc.

Mining in particular is a highly labour intensive activity, especially in an underwater environment because of the increased resistance to movement in water, potential health problems associated with persistent or prolonged deep-sea diving, and the cumbersome equipment required to enable workers to remain submerged for long periods of time. Similarly, terrestrial environments, such as surface or subsurface applications, may also have inhospitable environmental conditions that make wireless communication and teleoperation of mobile devices and vehicles desirable.

One aspect of optical communications is providing a suitable receiver that is capable of receiving an optical signal. Most commercial optical receivers are relatively delicate instruments that typically require close alignment with a transmitter for good communications. These optical receivers are generally not suitable for industrial or hazardous applications.

SUMMARY

Aspects of the disclosure include an optical receiver comprising a fiber support structure located on a front side of a back plate. The fiber support structure supports and guides a plurality of scintillating fibers in a spiral arrangement extending from a back orifice through the back plate. A central guide is located around the back orifice adapted to gather and collect the plurality of scintillating fibers from their disperse spiral arrangement on the fiber support structure and direct them through the back orifice as a bundle into a photo detector located behind the back plate.

BRIEF DESCRIPTION OF THE DRAWINGS

In drawings which illustrate by way of example only embodiments of the present disclosure, in which like reference numerals describe similar items throughout the various figures.

DETAILED DESCRIPTION OF THE INVENTION

Figure 1:
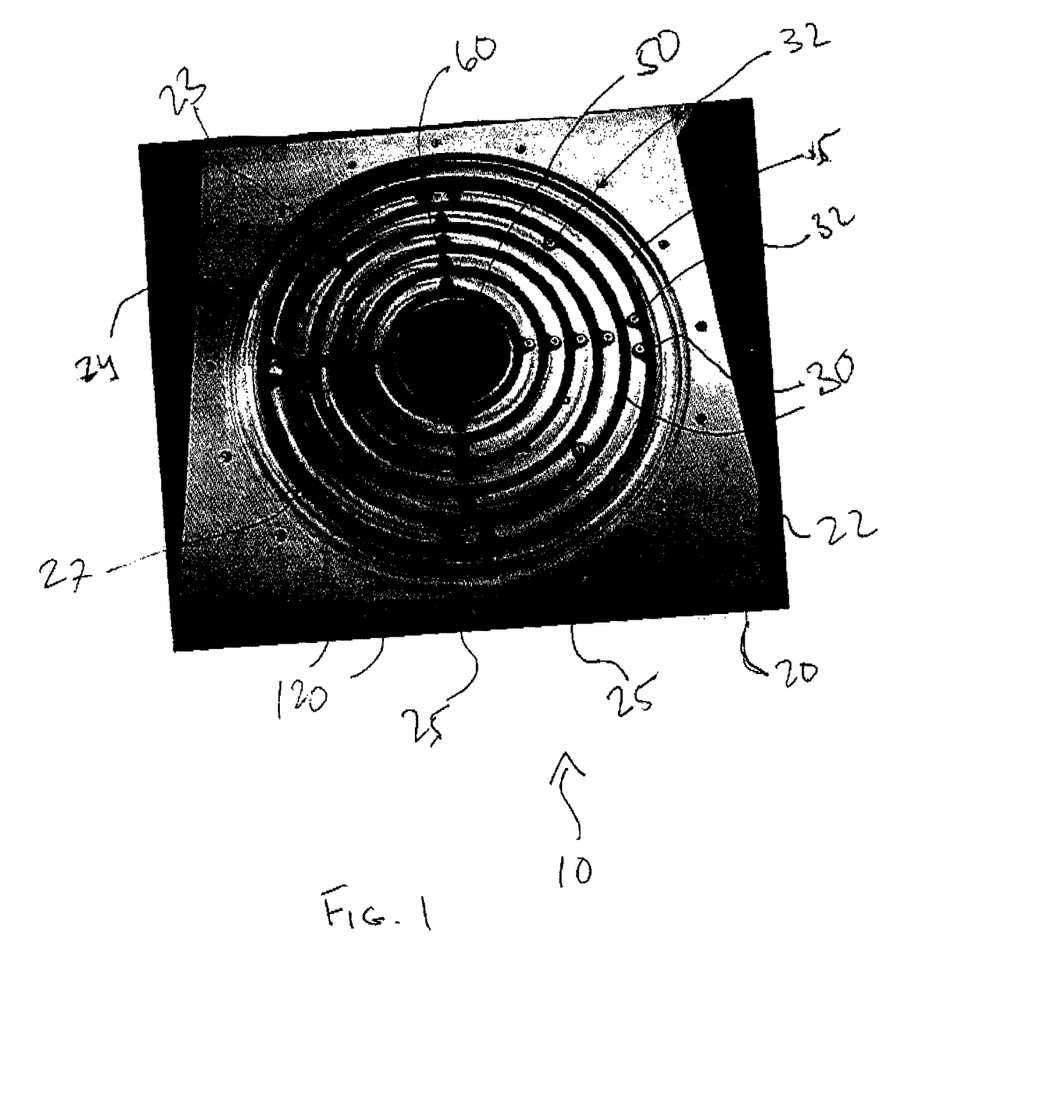
FIG. 1 is a perspective front view of an exemplary optical receiver.

FIG. 1 is a perspective front view of an optical receiver 10. The optical receiver 10 comprises a pair of plates 20 that are secured with plate fasteners 25. The plates 20 provide support and protection for a plurality of scintillating fibers 120 that are used to capture photons and direct them to a photo detector. In a preferred arrangement, the photo detector is a solid state photo detector.

The front plate 22 of the pair of plates 20 has a front orifice 23 through the front plate 22 that is intended to receive light for reception by the optical receiver 10. The back plate 24 includes a back orifice 60, smaller than the front orifice 23, which provides a pathway for the plurality of scintillating fibers 120 to pass from the plane of the detector through the back plate 24 to the photo detector.

A fiber support structure 27, in the embodiment of FIG. 1 comprising a plurality of concentric rings 30 arranged around a back orifice 60 in the backing plate 24 of the pair of plates 20 (visible through the front orifice through the front plate 22), supports and locates the plurality of scintillating fibers 120 in a spiral pattern extending from the orifice 60. In the embodiment illustrated the rings are secured to the backing plate 24 using ring fasteners 32.

In an alternate aspect, the fiber support structure 27 may be formed directly onto the surface of the backing plate 24, rather than being fastened onto the backing plate 24 surface.

The fiber support structure 27 may locate the plurality of scintillating fibers 120 in a planar arrangement, spiraling out from the back orifice 60. Alternatively, the fiber support structure 27 may arrange the plurality of scintillating fibers 120 in a concave arrangement, such as a spherical, conical, or parabolic arrangement, as they spiral out from the orifice 60.

A central guide 50 provides a grooved surface to gather and collect the plurality of scintillating fibers 120 from their disperse spiral arrangement on the fiber support structure 27 and direct them from a planar arrangement parallel with the plates 20, to a perpendicular arrangement as the fibers pass through the back orifice 60.

An optically clear shield 15, such as a glass shield, is located over the plurality of scintillating fibers 120 and secured to the front plate 22 of the pair of plates. In the embodiment illustrated, the shield 15 may be sandwiched between the pair of plates 20, and also secured with the plate fasteners 25. The shield is located over the front orifice 23, between the front plate 22 and the back plate 24, to isolate the plurality of scintillating fibers 120 and the back orifice 60 from the environment. The shield 15 may be selected to be optically clear relative to an incident light communication from a communicating optical transmitter.

Figure 2:
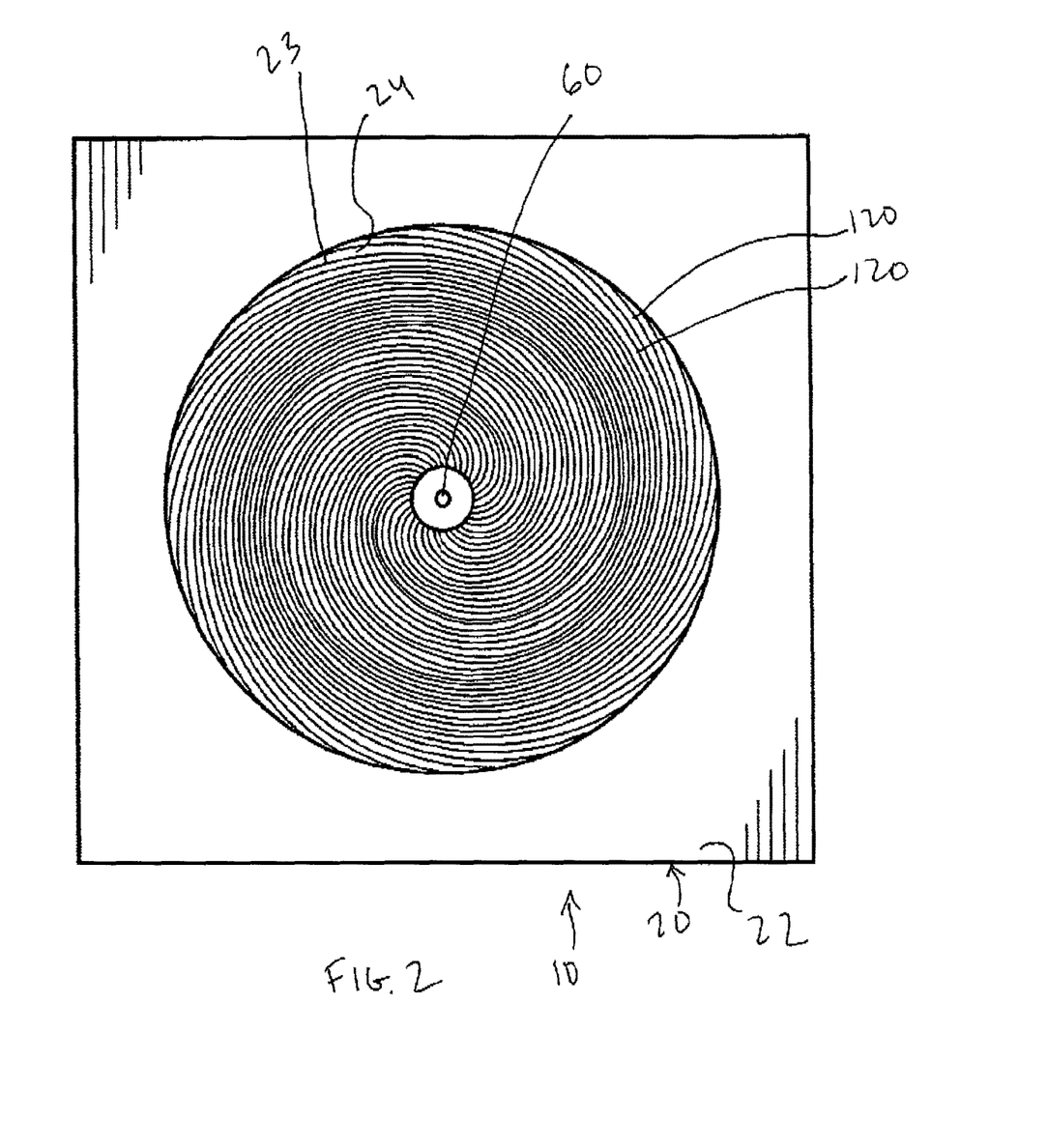
FIG. 2 is a simplified front view of the exemplary optical receiver highlighting the scintillating fibers.

FIG. 2 is a simplified front view of the optical receiver 10 highlighting the plurality of scintillating fibers 120. FIG. 2 does not include the fiber support structure 27 for clarity and to clearly show the spiral pattern of the plurality of scintillating fibers 120.

Figure 3:
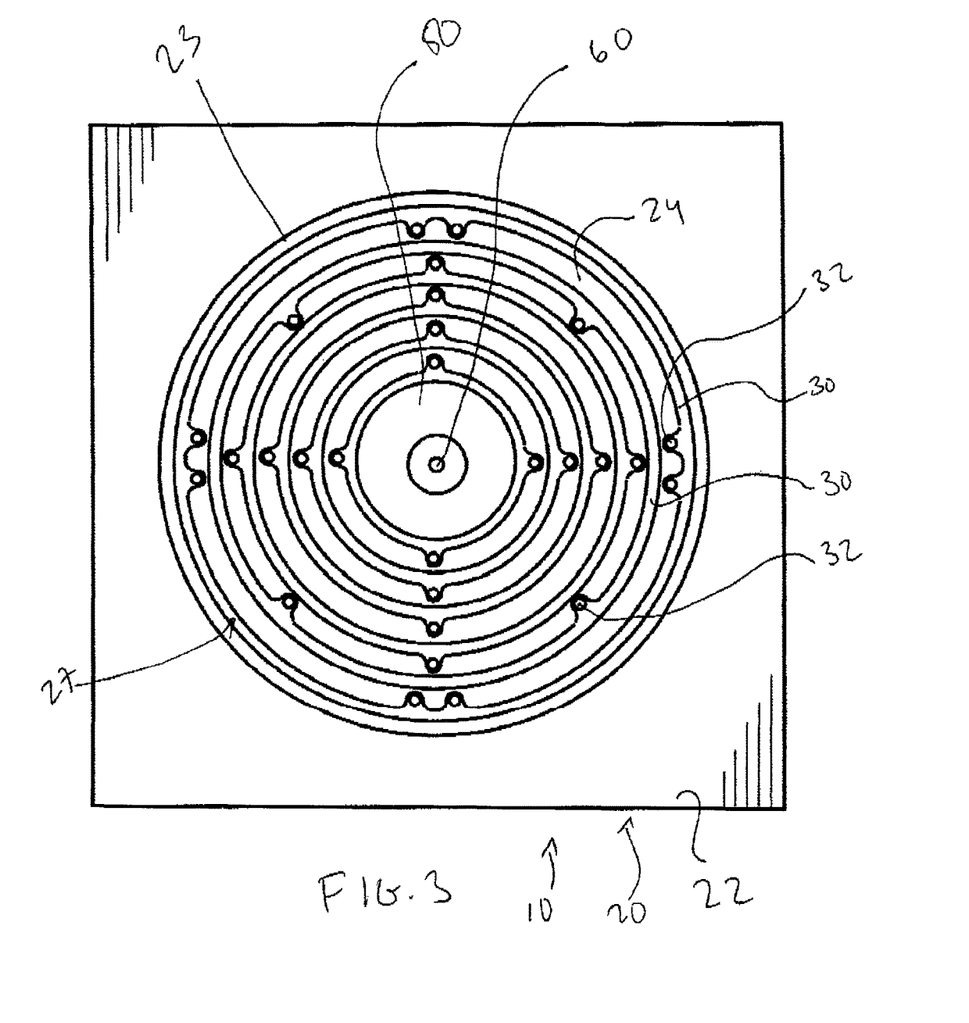
FIG. 3 is a second simplified front view of the exemplary optical receiver illustrated without the scintillating fibers to highlight the fiber support structure.

FIG. 3 is second simplified front view of the optical receiver 10. In this simplified view, the optical receiver 10 is illustrated without the plurality of scintillating fibers 120 to highlight the fiber support structure 27.

Figure 4A:
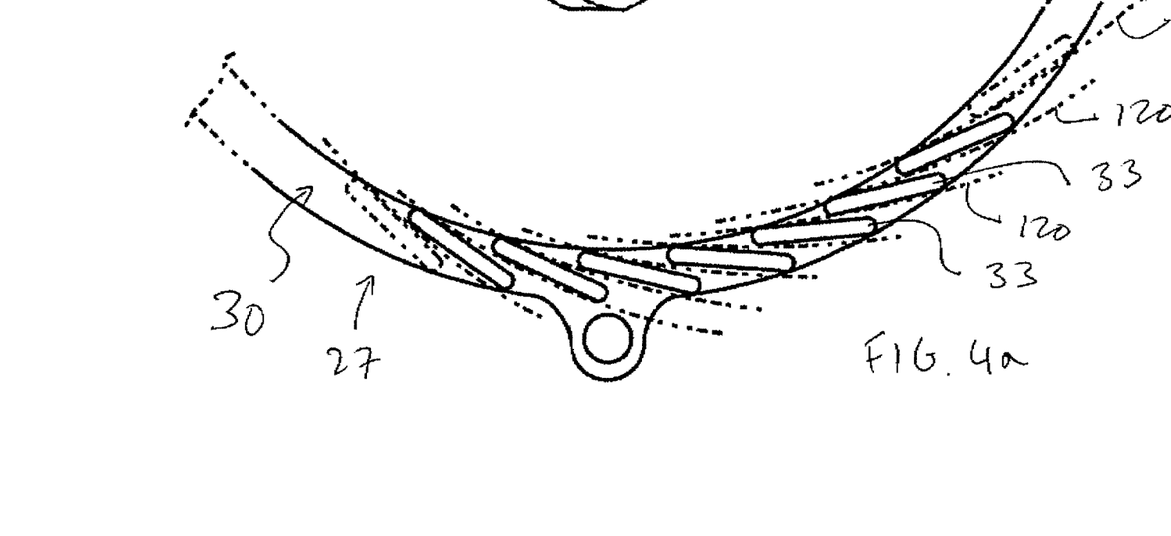
FIG. 4a is a closeup view of a portion of the fiber support structure of FIG. 3.
Figure 4B:
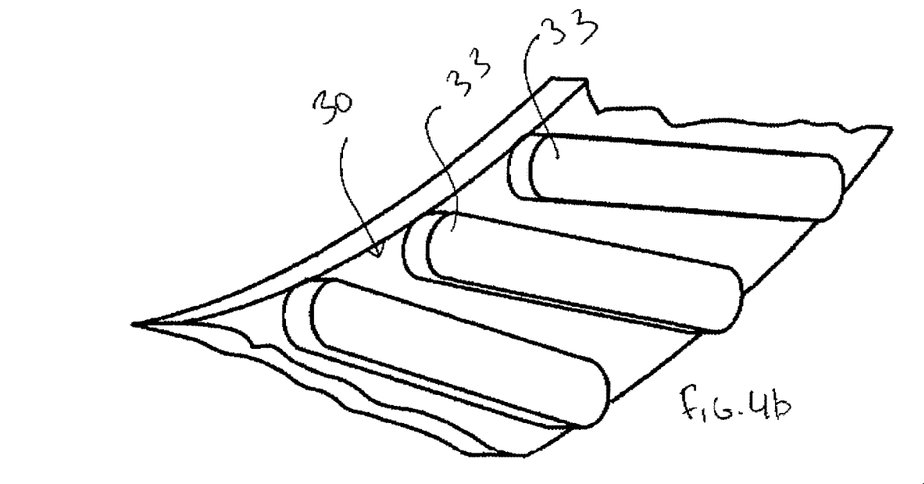
FIG. 4b is a closeup view of fiber guide details from the fiber support structure of FIG. 3.

FIGS. 4a and 4b are closeup views of the fiber support structure 27 of FIG. 3. FIG. 4a illustrates a portion of a ring 30 including fiber guides 33. Each fiber guide 33 oriented to guide one of the plurality of scintillating fibers 120 in their spiral pattern. FIG. 4b is a further close up view of the ring 30, illustrating the guides 33 without the plurality of scintillating fibers 120 being shown for clarity purposes.

The purpose of the guides 33 is to direct each of the plurality of scintillating fibers 120 along its own spiral path, without overlapping the path of another fiber. This aids in ensuring even coverage of the receiver area with fibers 120.

Figure 5:
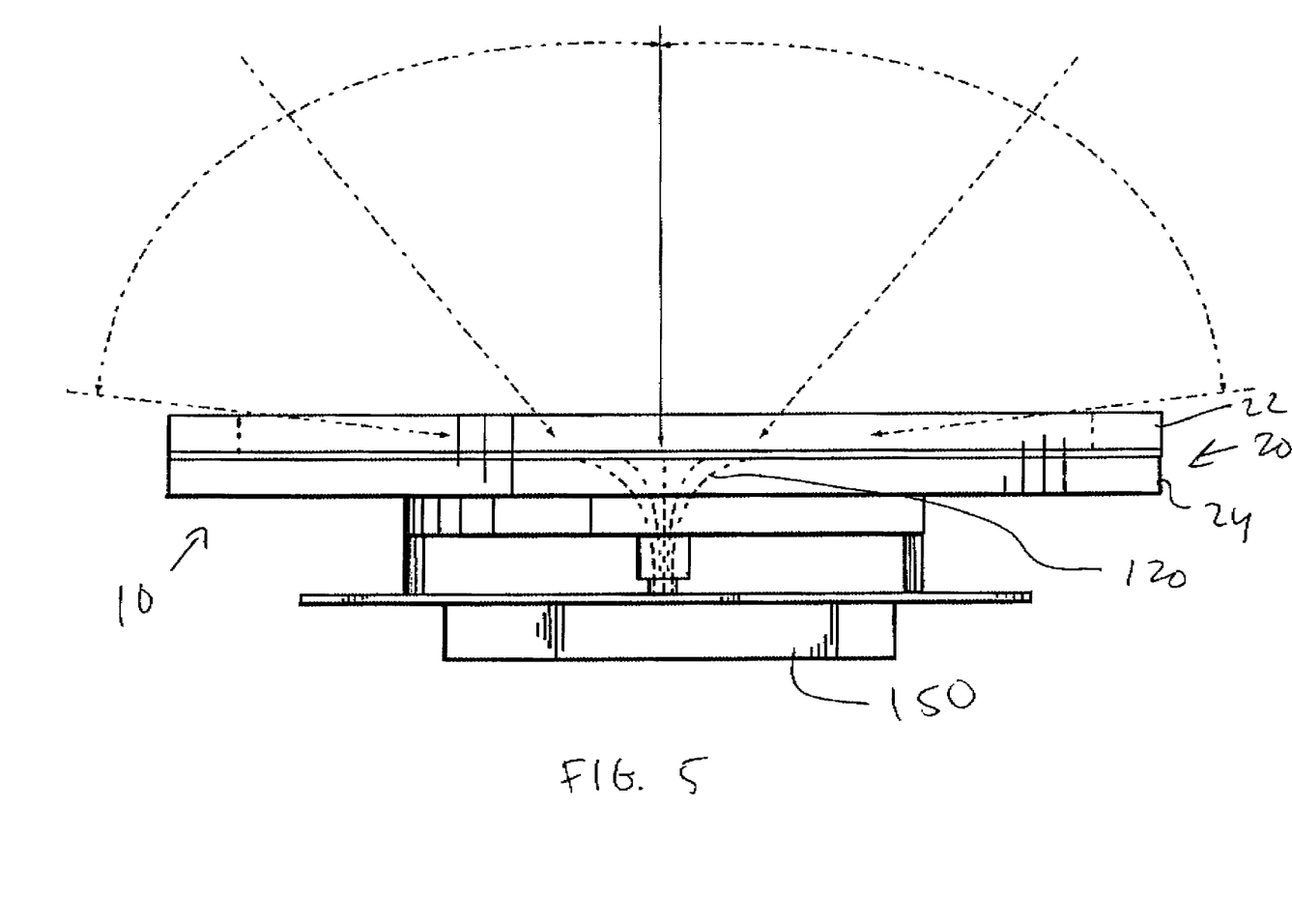
FIG. 5 is a simplified side view of the exemplary optical receiver.

FIG. 5 is a side view of the optical receiver 10, illustrating the wide range of incident photons that may be captured and detected by the optical receiver 10. The photo detector 150 is located on the back side of the optical receiver 10, behind the pair of plates 20. The photo detector 150 receives the plurality of scintillating fibers 120 as a bundle passing through the orifice 60 in the back plate 24. In this fashion the photo detector 150 may be protected from the environment behind the pair of plates 20.

Figure 6:
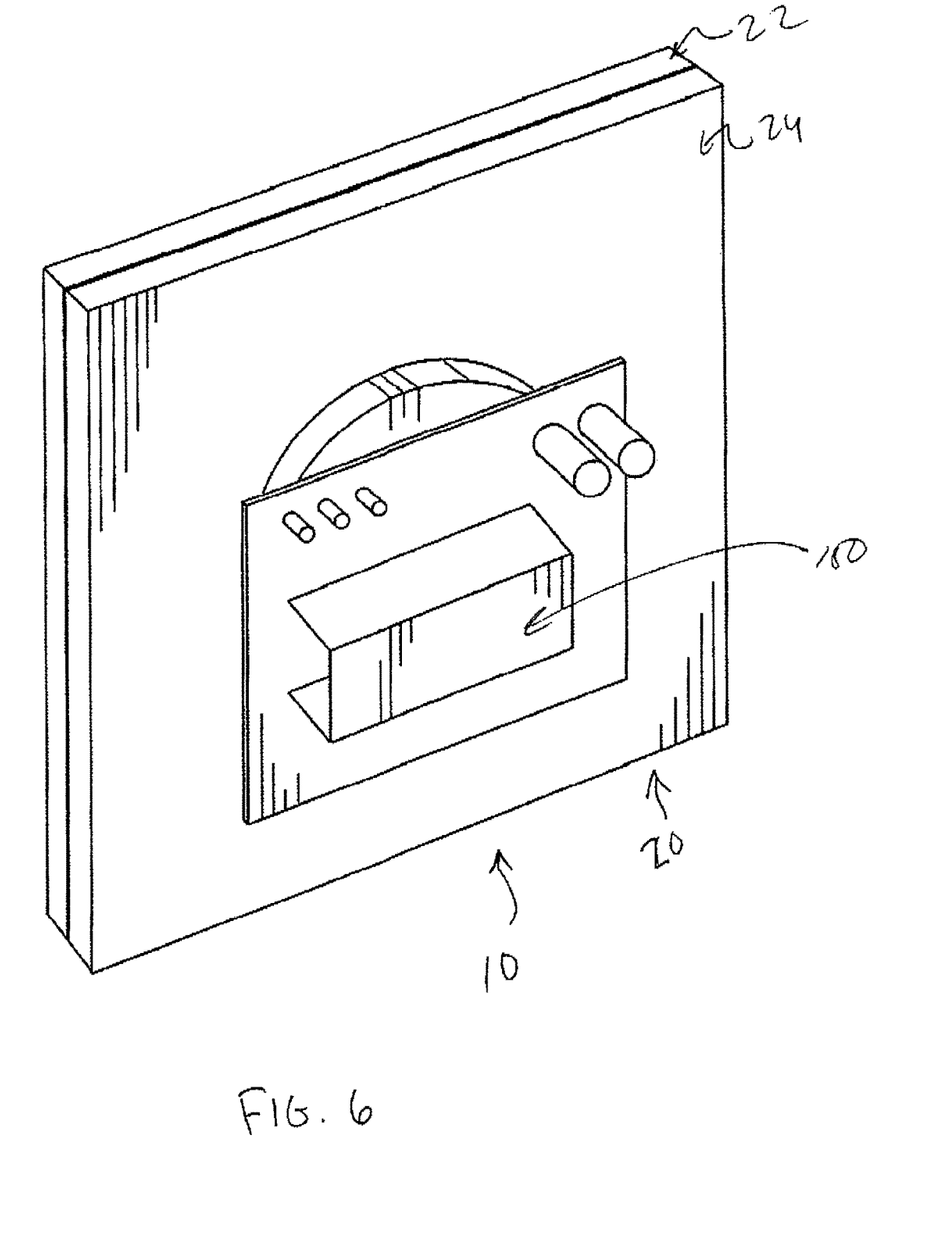
FIG. 6 is a rear view of the exemplary optical receiver.

FIG. 6 is a back view of the optical receiver 10 showing the back side of the back plate 24, and the electronics including the photo detector 150.

Figure 7:
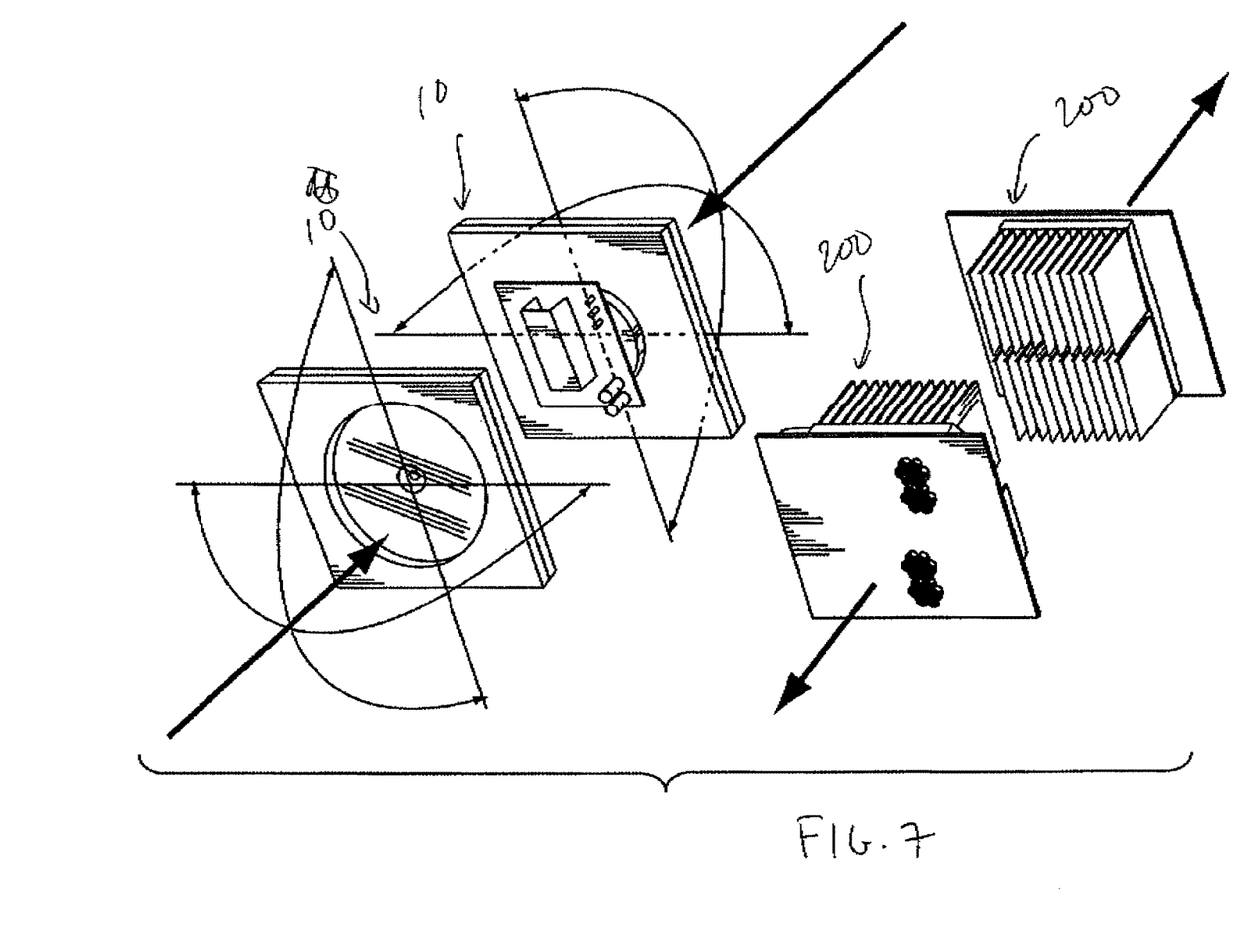
FIG. 7 is a simplified perspective illustration of exemplary opposed optical receiver and transmitter pairs.

FIG. 7 is an isometric illustration showing how two pairs of optical receiver 10 and optical transmitter 200 pairs can provide nearly 360 degree coverage for conducting optical communications within a space.

Figure 8:
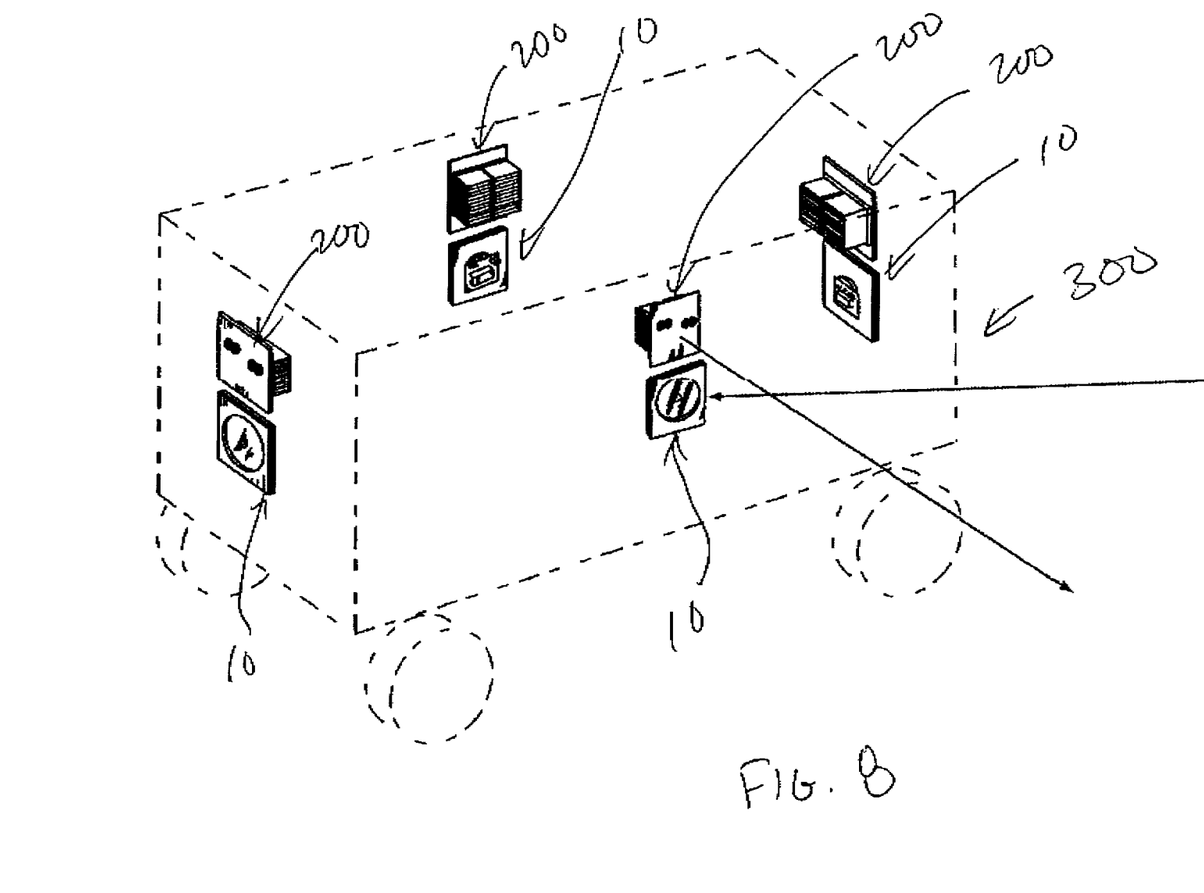
FIG. 8 is a simplified perspective illustration showing a potential arrangement of exemplary optical receiver and transmitter pairs on a vehicle.

FIG. 8 is a simplified illustration showing how an arrangement of four optical receiver 10 and optical transmitter 200 pairs may be arranged around a vehicle 300, such as a robot, to provide continuous coverage for an optical communications link within a space. Notably the optical receivers 10 do not need to be in exact alignment with optical transmitters 200 from another source, to maintain the optical communications link.

Figure 9:
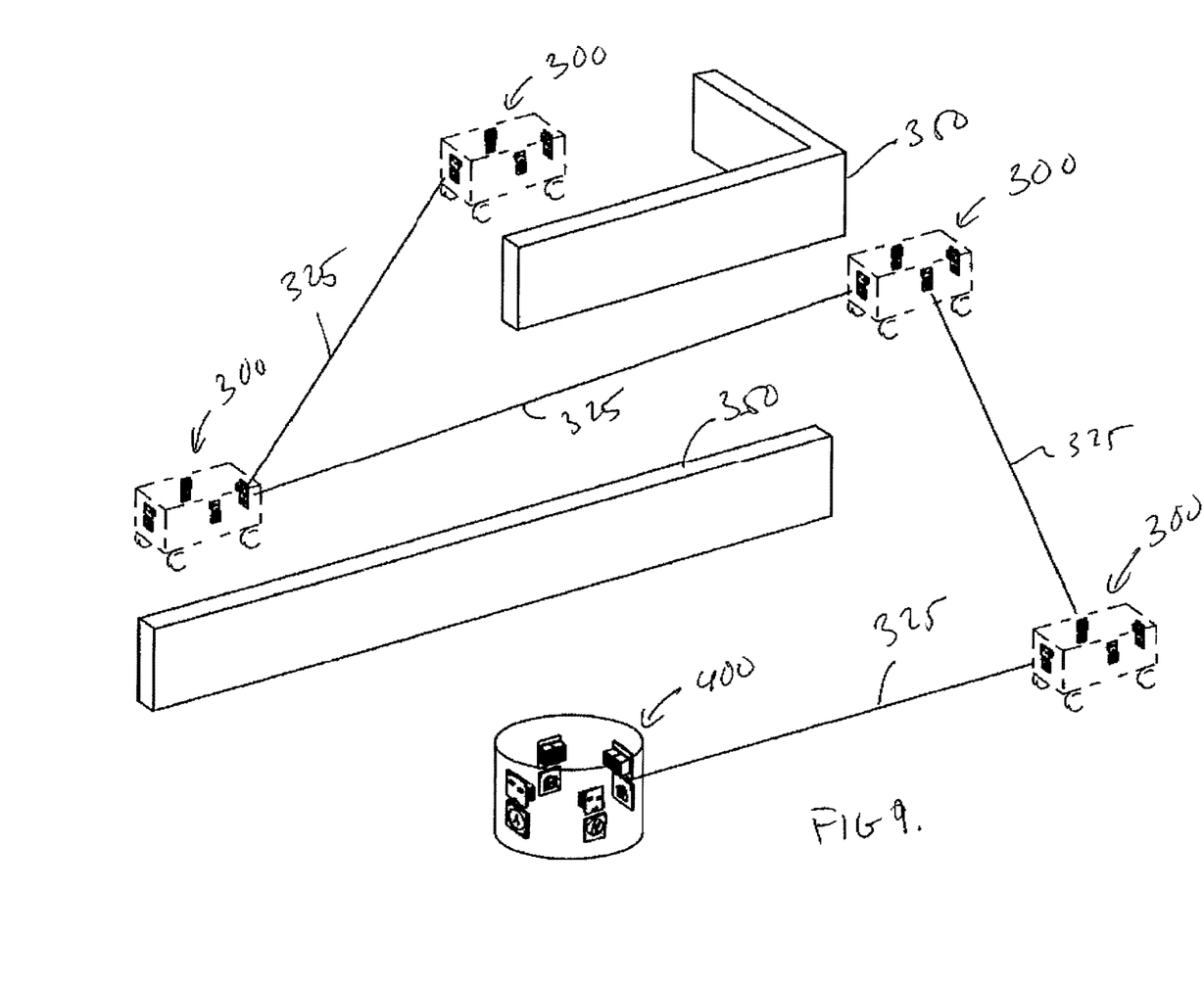
FIG. 9 is a simplified illustration of an exemplary network of the vehicles of FIG. 8 in communication with a base station.

FIG. 9 illustrates how a system of vehicles 300 may be used to provide an optical communications link 325 around obstacles 350 within an environment. In this fashion a base station 400 may provide local command and control communications over an optical communications link 325 that can be extended for non-line of sight communications. As indicated in FIG. 8, the optical receivers 10 may receive an optical communication from a communicating transmitter 200 even in situations where the communicating receiver-transmitter are not in perfect alignment.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

While the present disclosure has been discussed in terms of certain examples, it should be appreciated that the present disclosure is not so limited. The disclosure is explained herein by way of example, and there are numerous modifications, variations and other examples that may be employed that would still be within the scope of the present claims.

The invention claimed is:

1. An optical receiver comprising:
a fiber support structure located on a front side of a back plate;
the fiber support structure supporting and guiding a plurality of scintillating fibers in a spiral arrangement extending from a back orifice through the back plate;
a central guide located around the back orifice adapted to gather and collect the plurality of scintillating fibers from their disperse spiral arrangement on the fiber support structure and direct them through the back orifice as a bundle into a photo detector located behind the back plate; and
a front plate fastened onto the front side of the back plate;
the front plate including a front orifice through the front plate;
wherein the front orifice is sized larger than the spiral arrangement of the plurality of scintillating fibers.

2. The optical receiver of claim 1, further comprising:
a shield located over front orifice, between the front plate and the back plate;
the shield located to isolate the plurality of scintillating fibers and the back orifice from the environment.

3. The optical receiver of claim 1, wherein the fiber support structure comprises a plurality of concentric rings located around the back orifice.

4. The optical receiver of claim 3, wherein the plurality of concentric rings each comprise a plurality of fiber guides for directing each of the plurality of scintillating fibers along its own spiral path, separate from other scintillating fibers.

5. The optical receiver of claim 1, wherein the fiber support structure further supports the plurality of scintillating fibers in a planar orientation relative to a front side of the back plate.

6. The optical receiver of claim 1, wherein the fiber support structure further supports the plurality of scintillating fibers in one of a spherical, conical, or parabolic orientation relative to a front side of the back plate.

* * * * *